June 23, 1959     E. DURBIN     2,892,188
FRAMING CIRCUIT FOR LORAN RECEIVERS
Filed Jan. 12, 1956     2 Sheets-Sheet 2

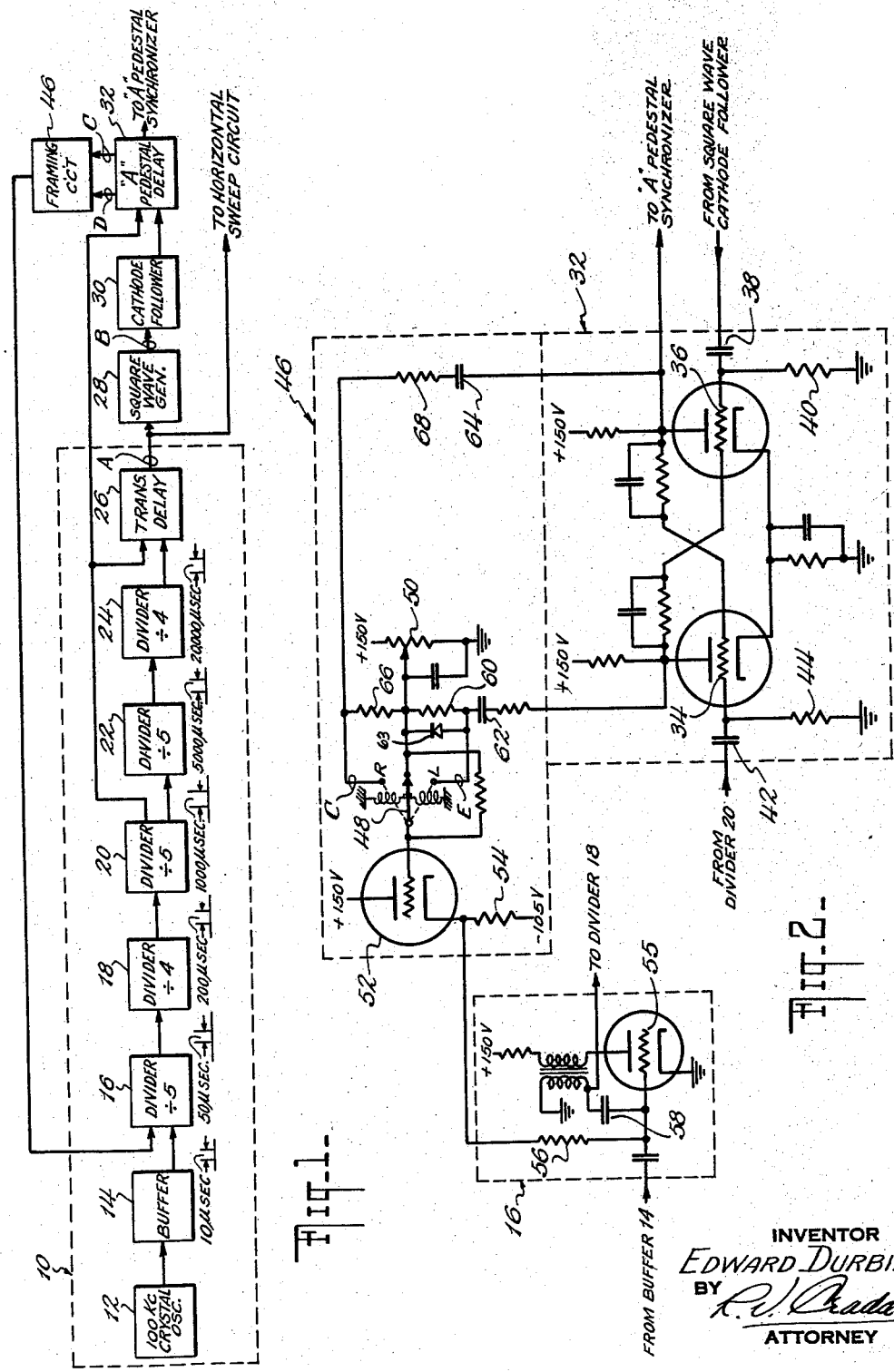

INVENTOR
EDWARD DURBIN
BY
ATTORNEY

United States Patent Office  2,892,188
Patented June 23, 1959

2,892,188

FRAMING CIRCUIT FOR LORAN RECEIVERS

Edward Durbin, Valley Stream, N.Y., assignor to Sperry Rand Corporation, a corporation of Delaware Application January 12, 1956, Serial No. 558,736

5 Claims. (Cl. 343—103)

This invention relates generally to crystal controlled electronic timing circuits, and more particularly, is concerned with means for shifting the output timing frequency by a slight degree without varying the frequency of the oscillator.

In a hyperbolic navigation system, such as loran, positional information is derived from a receiver which measures the time interval between pairs of received pulses, referred to as A and B pulses. The repetition frequency of these pulses is determined by the transmitters, the A pulses and the B pulses having the same repetition rate, but varying in their time relation to each other depending on the position of the receiver relative to the transmitters. The receiver, such as the loran receiver disclosed in Patent No. 2,651,033 to W. P. Frantz, is arranged to measure this time difference by means of a cathode ray tube indicator and precise timing circuits to determine the position of the receiver. Operation of the receiver depends on providing a slow horizontal sweep for the indicator tube having the same repetition frequency as the repetition frequency of the received pulses. This is achieved in the loran receiver by the provision of a crystal-controlled oscillator coupled to a divider chain to produce output pulses having exactly twice the repetition frequency as the received signals. The double frequency is required since, in the slow sweep phase of the indicator tube, two traces separated vertically from each other but constituting a single continuous time base are provided.

Not only must the sweep voltage be accurately controlled in frequency, but the phase relation between the sweep voltage and the received pulses must be controlled so that the received pulses, as applied to the vertical deflection plates of the cathode ray tube, may be made to appear at a predetermined position in relation to the time base of the horizontal sweep appearing on the cathode ray tube. For this purpose, a framing circuit is provided including a manually operated left-right switch by means of which the repetition rate of the output of the timing circuit controlling the sweep may be increased or decreased slightly so as to change the phase relationship between the horizontal sweep and the received pulses. As a result the received pulses appearing on the cathode ray tube can be caused to drift to the right or left and be brought into the proper position along the extent of the horizontal trace.

One obvious way of producing a small increase or decrease in the repetition rate of the horizontal sweep is to change the frequency of the crystal-controlled oscillator. However, it has been found that it is not practical to shift the oscillator frequency of a crystal-controlled oscillator a sufficient amount to cause an appropriate rate of drift of the received signal pulse along the horizontal trace.

Another method of increasing or decreasing the pulse repetition rate of the timer output is to alter the division ratio of one of the dividers in the divider chain for one or more output periods of the divider. For example, if one divider in the chain having an output period of 1000 microseconds is made to trigger in response to one less or one more in the number of input pulses from the previous divider in the chain in just one cycle of the divider during each repetition interval of the received loran pulses, a suitable rate of drift of the received pulse indications on the cathode ray tube screen may be achieved. In existing loran receivers there has been provided a divider in the chain including a blocking oscillator controlled by a step counter. After five input pulses, for example, the step counter builds up to a voltage sufficient to bias the blocking oscillator conductive, triggering an output pulse. The framing function has been achieved heretofore by adding a rectangular voltage pulse having a duration equal to the normal output period of the blocking oscillator to the output of the step counter. During the interval of the pulse, the blocking oscillator is caused to fire one step earlier or one step later, depending on the polarity of the rectangular pulse.

Such prior art arrangement has proved unstable and unreliable in operation where it is desired that the blocking oscillator fire on a later step of the step counter. The reason is that each successive step in the output of the step counter has a smaller increment of amplitude, so that a very slight drift in the cutoff level of the blocking oscillator tube or change in grid current during the conductive period of the blocking oscillator may cause the blocking oscillator to continue to fire on the earlier step or may cause it to fire on an even later step of the step counter. In the former case no drift of the received pulse on the cathode ray tube screen is produced when the left-right switch is actuated for left drift. In the latter case the rate of drift is much too fast for the operator to control. Left framing in such a prior art framing circuit has the effect of greatly reducing the stable range of the blocking oscillator, i.e., the range in which various parameters associated with the blocking oscillator circuit may change without changing the dividing ratio.

It is accordingly a general object of the present invention to provide an improved framing circuit in conjunction with the timer of a loran receiver which is characterized by greater stability and reliability and yet is relatively simple and inexpensive in its circuitry.

Another object of this invention is the provision of a new circuit which accomplishes the framing function in a loran receiver without reducing the stable operating range of the associated blocking oscillator divider in the timer circuit.

These and other objects of the invention which will become apparent as the description proceeds are achieved by the provision of a crystal controlled timer and framing circuit for a loran receiver comprising a crystal oscillator and a divider chain of blocking oscillators. Means coupled to the output of the divider chain produces simultaneously a negative-going rectangular pulse and a positive-going rectangular pulse of predetermined duration, the pulses occurring once each repetition interval of the received loran pulses. A differentiating circuit responsive to the negative-going rectangular pulse produces a negative pulse with an exponentially rising trailing edge coincident with the start of the negative-going rectangular pulse but of reduced duration. A manual switch selectively couples the positive-going pulse or the differentiated negative-going pulse through a cathode follower to the grid of the first blocking oscillator in the chain. The negative-going pulse causes the divider to be blocked for a predetermined time interval; the positive-going pulse causes the divider to fire in response to one less in the number of input pulses for a predetermined number of cycles of the divider, whereby the output period of the timer, by manually selecting the positive-going or negative-going pulses is slightly increased or decreased respectively.

For a better understanding of the invention reference should be had to the accompanying drawings, wherein:

Fig. 1 is a block diagram of the timer circuit and associated framing circuit for a loran receiver;

Fig. 2 is a schematic diagram of the framing circuit;

Figure 3:
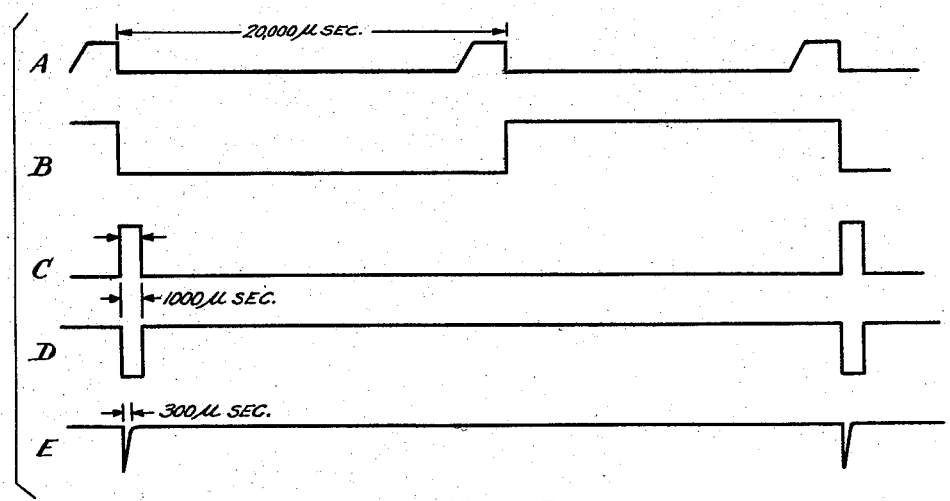
Figure 4A:
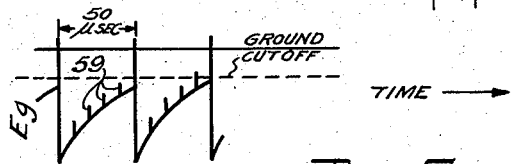
Figure 4B:
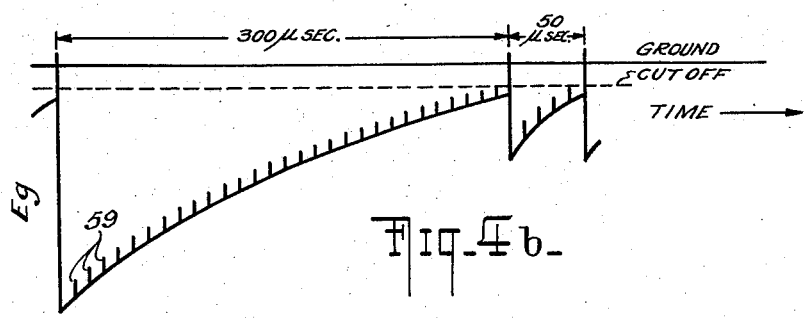
Figure 4C:
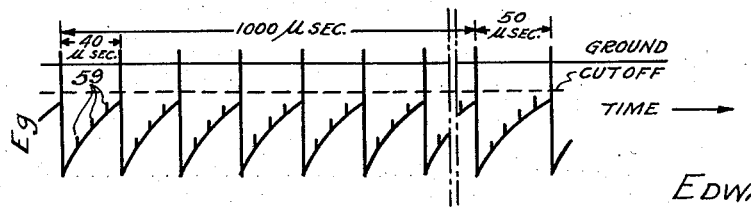

Fig. 3A–E is a series of waveforms of voltages associated with the timer and framing circuit; and Fig. 4A–C is a series of curves showing the waveform of the grid voltage on the blocking oscillator controlled by the framing circuit.

The timer and framing circuit of the present invention is hereinafter described as constituting a portion of a loran receiver, and particularly, the loran receiver described in the above-identified patent to Frantz. While the present invention applies particularly to such receiver, it is to be understood that the invention is not limited to such application but has general utility wherever it is desired to selectively increase or decrease the output repetition frequency of a crystal-controlled pulse timer by a small increment, where direct control of the controlling oscillator frequency is not practical or desirable.

Referring to Fig. 1, the numeral 10 indicates generally the timer circuit of a loran receiver, corresponding to the oscillator and divider circuit 25 of Fig. 1 in the above-identified Frantz patent. Such a conventional timer circuit generally includes a crystal oscillator 12 which, for example, may be a 100 kc. oscillator. The output of the crystal oscillator 12 is coupled through a buffer circuit 14 to a divider chain including five blocking oscillator-type divider circuits indicated at 16, 18, 20, 22, and 24. The dividers divide the frequency of the oscillator output voltage in the steps of 5, 4, 5, 5, and 4, respectively, whereby the ten microsecond period of the 100 kc. signal is increased to a 20,000 microsecond period at the output of the divider 24.

Thus the output repetition rate from the divider 24 is 50 cycles per second, which is exactly twice the basic pulse repetition rate used in loran of 25 cycles per second. The divider chain may be modified to operate at other loran repetition rates in conventional manner. However, for the sake of simplicity, operation at one basic repetition rate is described by way of example, since the principles of operation of the invention can be applied equally well for all basic loran pulse repetition rates.

The output from the last divider 24 is coupled to a transient delay circuit 26, which may be a multivibrator triggered on by the pulses from the divider 24 and triggered off by pulses from the divider 20. Pulses from the transient delay circuit 26 are coupled to the horizontal sweep circuit of the cathode ray indicator (not shown) in the loran receiver.

The output pulses from the transient delay circuit 26 are also coupled to a square-wave generator, which is preferably an Eccles-Jordan type circuit, for producing a square-wave output voltage whose frequency equals one half the repetition frequency of the trigger pulses from the transient delay circuit 26. A cathode follower circuit 30 couples the square-wave output to an A pedestal delay circuit 32. The square-wave generator 28, the cathode follower 30, and the A pedestal delay 32 correspond respectively to the square-wave generator 51, cathode follower 53 and A pedestal delay 57 in Fig. 1 of the above-identified Frantz patent.

The A pedestal delay circuit 32, as shown by the schematic diagram of Fig. 2, consists of a bistable multivibrator having a pair of triodes 34 and 36. The square-wave from the cathode follower 30 is coupled through a differentiating circuit consisting of a capacitor 38 and resistor 40 to the grid of the triode 36, which is normally conductive. The negative-going pulses derived by the differentiating circuit from the square-wave input cut off the triode 36 and cause the triode 34 to conduct. As a result the plate potential of the triode 36 rises while the plate potential of the triode 34 drops.

The next output pulse from the divider 20 is coupled through a differentiating circuit including a capacitor 42 and resistor 44 to the grid of the triode 34. The negative-going pulse cuts the triode 34 off causing the triode 36 to conduct again. As a result the plate potential of the triode 34 rises and the plate potential of the triode 36 drops. As shown in Figs. 3C and D, a positive-going rectangular pulse is produced at the plate of the triode 36 while a negative-going rectangular pulse is produced at the plate of the triode 34, the duration of the rectangular pulses being equal to the period of the divider 20, namely, 1000 microseconds. These respective positive-going and negative-going rectangular pulses are coupled from the A pedestal delay circuit 32 to a framing circuit 46. As will hereinafter be explained in detail, the framing circuit 46 utilizes the positive-going and negative-going rectangular pulses from the A pedestal delay 32 to modify the action of the divider 16 in the divider chain to increase or decrease the period between pulses from the transient delay 26 by a predetermined amount, to give the desired drift rate of the received pulse indications on the cathode ray tube indicator. This is accomplished according to the present invention in the following manner.

The framing circuit 46 includes a manually operated spring-centered switch 48. The switch 48 is normally biased to its centered contact position by spring centering, completing a circuit between the sliding contact of a potentiometer 50 and the grid of a cathode follower stage 52. The output from the cathode follower stage is taken across the cathode resistor 54 and connected to the grid of a blocking oscillator tube 55 in the divider 16 through a leakage resistor 56. Thus adjustment of the potentiometer 50 fixes the bias level on the grid of the blocking oscillator tube.

In Fig. 4A is shown a plot of grid voltage on the blocking oscillator tube 55 as a function of time. The blocking oscillator fires whenever the grid voltage rises above the cutoff level indicated by the dotted line. After firing, the grid drops to a negative value far below cutoff and then begins to rise exponentially at a rate determined by the R-C time constant of the grid leak resistor 56 and the grid capacitor 58. The setting of the bias potentiometer 50 determines the voltage level to which the grid rises when the capacitor 58 is fully discharged. This value is adjusted so that a desired one of the pulses (indicated at 59 in Fig. 4) from the buffer 14 pushes the grid above cutoff, causing the blocking oscillator to fire, for example, on every fifth input pulse.

The switch 48 in the framing circuit 46 is provided with a Left contact, indicated as L, and a Right contact indicated as R, Right and Left referring to the respective directions the received signal pulse indication tends to drift across the face of the cathode ray indicator tube of the loran receiver. The contact L is connected to the plate of the triode 34 of the A pedestal delay 32 through a differentiating network including a resistor 60 and capacitor 62. The time constant of the R-C differentiating network 60, 62 is preferably adjusted so that the capacitor 62 substantially discharges in 300 microseconds following the negative front edge of the rectangular pulse from the plate of the triode 34. A diode 63 clips the positive pulse normally produced by the differentiating circuit at the end of the rectangular input pulse. The negative pulse is coupled by the switch 48 when it is held in the Left position through the cathode follower 52 to the grid of the blocking oscillator tube 55 in the divider 16.

The negative pulse holds the grid bias of the tube 55 below cutoff for substantially 300 microseconds, the duration of the negative pulse. Since the input pulses to the divider 16 have a repetition period of 10 microseconds, the blocking oscillator tube is not fired until the 30th input pulse. The resulting waveform of the grid voltage is shown in Fig. 4B. It should be noted that the rise of the grid voltage during left framing is made more linear by the constantly decreasing negative restoration voltage applied by the 300 microsecond pulse.

Since the first output from the divider 16 is delayed from 50 microseconds to 300 microseconds by the framing circuit 46 during the left framing mode of operation, the next output pulse from the transient delay circuit 26 is delayed by 250 microseconds. Therefore each sweep on the cathode ray indicator tube during the Left framing mode of operation occurs 250 microseconds later than it would in the normal mode of operation, so that the indicated loran pulses appear to drift to the left on the indicator tube face.

In the Right framing mode of operation, the switch 48 connects the grid of the cathode follower to the contact R. The contact R is connected by a coupling capacitor 64 to the plate of the triode 36 in the pedestal delay circuit 32. Thus a positive-going rectangular pulse of 1000 microseconds duration is applied to the grid of the blocking oscillator tube in the divider 16. The amplitude of the applied pulse is adjusted by means of a voltage divider formed by resistors 66 and 68 to change the blocking oscillator bias sufficiently to cause the blocking oscillator tube to fire on the fourth input pulse instead of the fifth input pulse. Thus during an interval of 1000 microseconds for each repetition interval of the received loran pulses the divider 16 has a division ratio of 4 instead of 5. As a result the divider 16 puts out five additional pulses during the first 1000 microseconds of the basic loran pulse repetition. Since the divider now puts out 25 pulses in the time it formerly put out 25 pulses, the time it takes to put out 20 pulses during the right frame mode of operation is reduced by 250 microseconds. Consequently the period between pulses from the transient delay circuit 26 is reduced by 250 microseconds. As a result each sweep in the Right framing mode of operation occurs 250 microseconds sooner than it would in the normal mode of operation, causing the indicated loran pulses to appear to drift to the right on the indicator tube face.

From the above description it will be recognized that the various objects of the invention have been achieved by the provision of a framing circuit which modifies the output frequency of the timer circuit without impairing the stability range of any of the dividers in the divider chain. By biasing off the first oscillator in the chain for a number of cycles, any instability or change in the blocking oscillator parameters can not materially affect the output frequency of the chain. For instance if the blocking oscillator of the first divider would recover after twenty-nine input pulses instead of thirty, this would have little effect on the drift rate during Left framing.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A timer for a loran receiver comprising a crystal controlled oscillator, a divider chain including a first grid controlled blocking oscillator type divider, a buffer coupling the output of the crystal controlled oscillator to the first blocking oscillator, means coupled to the output of the divider chain for generating a negative-going rectangular pulse having a duration that is long compared to the period of the crystal controlled oscillator and that is short compared to the period of the divider chain output, means coupled to the output of the divider chain for generating a positive-going rectangular pulse of the same duration as and occurring simultaneously with the negative-going pulse, means including a differentiating circuit and clipping circuit responsive to said negative-going pulse for generating a negative-going pulse of appreciably longer duration than the period of said crystal controlled oscillator but of substantially shorter duration than the duration of the rectangular pulses, and means including a manual switch for selectively coupling the positive-going rectangular pulse and the negative-going differentiated pulse to the grid of the blocking oscillator, whereby the blocking oscillator is either biased off by the negative-going differentiated pulse or biased by the positive-going pulse to trigger on an earlier input pulse for a predetermined number of cycles of the blocking oscillator.

2. A timer for a loran receiver comprising a crystal controlled oscillator, a divider chain including a first grid controlled blocking oscillator type divider coupling the output of the crystal controlled oscillator to the divider chain, means coupled to the output of the divider chain for generating a negative-going rectangular pulse, means coupled to the output of the divider chain for generating a positive-going rectangular pulse of the same duration as and occurring simultaneously with the negative-going pulse, means including a differentiating circuit and clipping circuit responsive to said negative-going pulse for generating a negative-going pulse of appreciably longer duration than the period of said crystal controlled oscillator but of substantially shorter duration than the duration of the rectangular pulses, and means including a manual switch for selectively coupling the positive-going rectangular pulse and the negative-going differentiated pulse to the grid of the blocking oscillator, whereby the blocking oscillator is either biased off by the negative-going differentiated pulse or biased by the positive-going pulse to trigger on an earlier input pulse for a predetermined number of cycles of the blocking oscillator.

3. A timer for a loran receiver comprising a crystal controlled oscillator, a divider chain including a first grid controlled blocking oscillator type divider, a buffer coupling the output of the crystal controlled oscillator to the first blocking oscillator, means coupled to the output of the divider chain for generating a positive-going rectangular pulse that is long compared to the period of the crystal controlled oscillator and short compared to the period of the divider chain output, means for generating a negative-going pulse of appreciably shorter duration than the duration of the rectangular pulse; and means including a manual switch for selectively coupling the positive-going rectangular pulse and the negative-going pulse to the grid of the blocking oscillator, whereby the blocking oscillator is either biased off by the negative-going pulse or biased by the positive-going pulse to trigger on an earlier input pulse for a predetermined number of cycles of the blocking oscillator.

4. In a loran receiver having a crystal controlled oscillator and divider chain including at least one blocking oscillator, means for selectively increasing or decreasing the output frequency of the divider chain comprising means triggered by the output of the divider chain for generating a pair of rectangular pulses of predetermined duration, one of the pulses being a positive-going pulse and the other being a negative-going pulse, means for differentiating and clipping the negative-going rectangular pulse, and means including a switch for selectively coupling the positive-going pulse or the differentiated negative-going pulse to a blocking oscillator in the divider chain.

5. In a loran receiver having a crystal-controlled oscillator and divider chain including at least one blocking oscillator, means for momentarily decreasing slightly the output frequency of the divider chain comprising means triggered by the output of the divider chain for generating a negative-going rectangular pulse, means for differentiating and clipping the negative-going rectangular pulse, and means including a switch for selectively coupling the differentiated negative-going pulse to a blocking oscillator in the divider chain to bias the blocking oscillator off for a predetermined interval, whereby the output of the divider chain is delayed.

References Cited in the file of this patent
UNITED STATES PATENTS

| | | |
|---|---|---|
| 2,430,570 | Hulst | Nov. 11, 1947 |
| 2,445,361 | Mountjoy | July 20, 1948 |
| 2,487,822 | McLamore | Nov. 15, 1949 |

UNITED STATES PATENT OFFICE
CERTIFICATE OF CORRECTION

Patent No. 2,892,188                                                  June 23, 1959

Edward Durbin

It is hereby certified that error appears in the printed specification of the above numbered patent requiring correction and that the said Letters Patent should read as corrected below.

Column 5, line 24, for "25 pulses" read -- 20 pulses --.

Signed and sealed this 5th day of April 1960.

(SEAL)
Attest:

KARL H. AXLINE                                            ROBERT C. WATSON
Attesting Officer                                       Commissioner of Patents